(No Model.)
C. P. SNOW.
HARROW.
No. 303,758.     Patented Aug. 19, 1884.
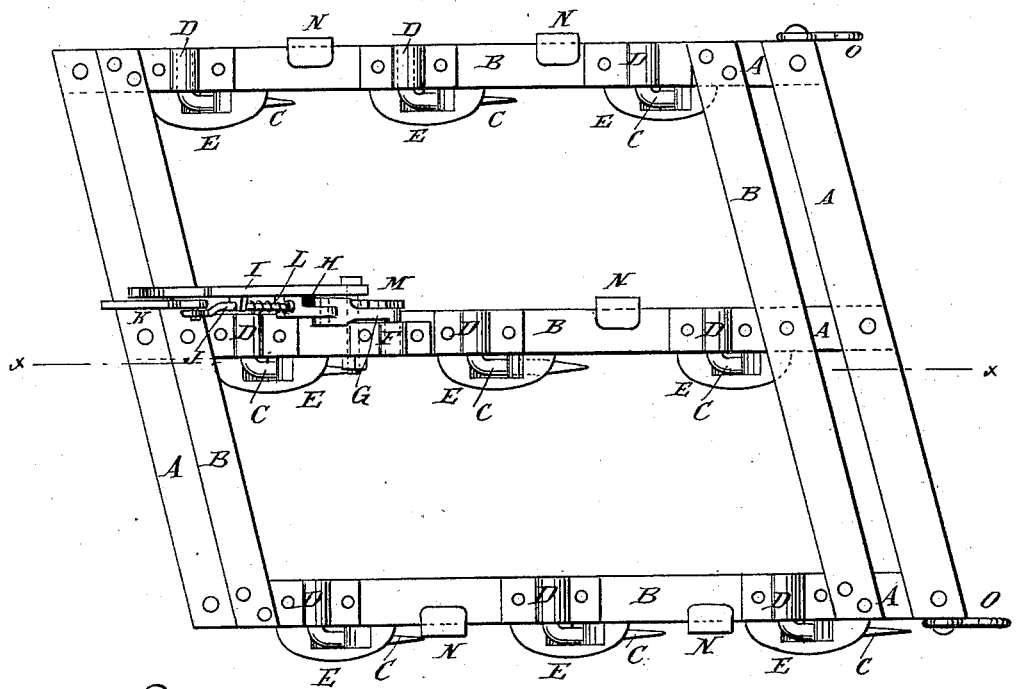
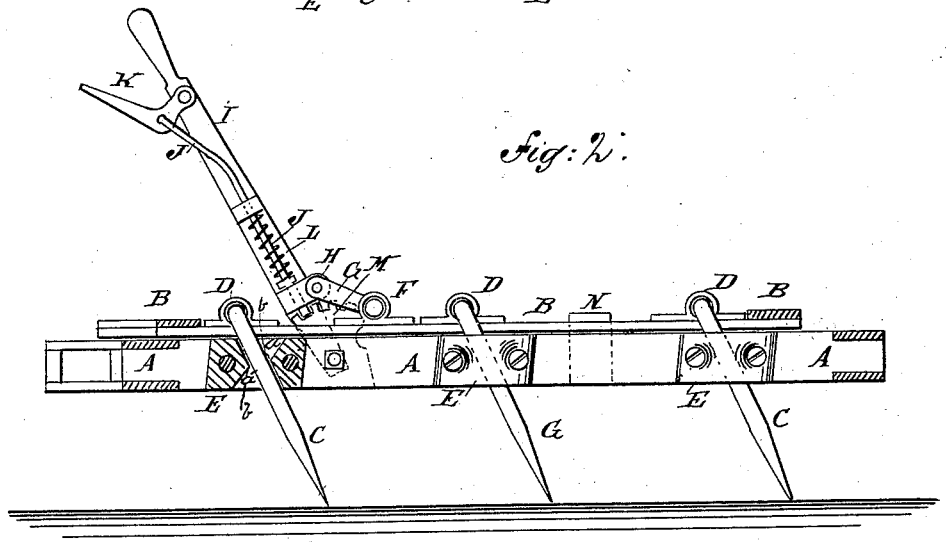
WITNESSES:
INVENTOR:
C. P. Snow
BY Munn & Co.
ATTORNEYS.

UNITED STATES PATENT OFFICE.

CHARLES P. SNOW, OF LANARK, ILLINOIS.

HARROW.

SPECIFICATION forming part of Letters Patent No. 303,758, dated August 19, 1884.

Application filed February 8, 1884. (No model.)

*To all whom it may concern:*

Be it known that I, CHARLES P. SNOW, of Lanark, in the county of Carroll and State of Illinois, have invented a new and useful Improvement in Harrows, of which the following is a full, clear, and exact description.

Reference is to be had to the accompanying drawings, forming a part of this specification, in which similar letters of reference indicate corresponding parts in both the figures.

Figure 1 is a plan view of one of my improved harrows. Fig. 2 is a sectional side elevation of the same, taken through the line $x\ x$, Fig. 1.

My invention relates to improvements in harrows; and it consists in the peculiar construction and arrangement of the parts, as hereinafter more fully set forth, and pointed out in the claims.

A is the main frame, which is formed of three or more longitudinal bars connected by cross-bars attached to their ends.

Upon the upper sides of the longitudinal bars of the frame A rest the longitudinal bars of the frame B, which are made shorter than the said longitudinal bars of the frame A, and are connected at their ends by cross-bars.

C are the harrow-teeth, the upper ends of which are bent to one side at right angles to form pivots to work in bearings D, attached to the tops of the longitudinal bars of the frame B.

To the sides of the longitudinal bars of the frame A are attached fulcrum-bearings E, through which the harrow-teeth C pass. The apertures of the bearings E are flared at the forward and rear sides of their upper and lower ends, $a\ a'$, as shown in Fig. 2, so that the said teeth will be firmly supported by the opposite parts, $b\ b$, of the apertures in the fulcrum-bearings E when vertical and when inclined forward or rearward by the sides of the apertures in the bearings E.

To the middle bar of the frame B, a little in the rear of its center, is attached a bearing, F, in which works a pivot formed upon the side of the forward end of the connecting-bar G. The rear end of the bar G is pivoted to a lug, H, formed upon or attached to the lever I, which is pivoted at its lower end to a longitudinal bar of the frame A, so that the frame B can be moved upon the frame A to adjust the teeth C by operating the lever I.

In bearings attached to the side of the lever I slides a pawl, J, the upper end of which is pivoted to a small elbow-lever, K, pivoted to the upper part of the said lever I. The pawl J is held down by a spiral spring, L, placed upon its lower part, and its lower end engages with recesses in the curved upper edge of a catch-plate, M, attached to a bar of the frame A, so as to hold the frame B and teeth C firmly in any position into which they may be adjusted. The sliding frame B is held from lateral movement upon the frame A by guides N, attached to the longitudinal bars of the frame A, and which have their upper ends bent over at right angles to overlap the upper sides of the longitudinal bars of the frame B. The forward corners of the frame A are provided with hooks O or other devices to receive the draft.

Having thus described my invention, I claim as new and desire to secure by Letters Patent—

1. In a harrow, the combination, with the main frame A, the sliding frame B, the swinging teeth C, having the upper laterally-bent ends, and the bearings D, secured to the sliding frame, of the bearings E, having apertures $a\ a'$, with upper and lower flared surfaces, and means for adjusting the sliding frame, substantially as shown and described, and for the purpose set forth.

2. In a harrow, the combination, with the main frame A, the sliding frame B, the swinging teeth C, bent at their upper ends to form pivots, and the bearings D, secured to the sliding frame, of the bearings E, having flaring upper and lower apertures, $a\ a'$, meeting at their smaller ends and opposite parts $b\ b$, bearing F, hinged bar G, lever I, spring-pressed pawl J, lever K, and catch-plate M, substantially as shown and described.

CHARLES P. SNOW.

Witnesses:
J. M. CROSS,
JOHN PALEY.